(No Model.) 6 Sheets—Sheet 1.

H. R. TOWNE.
ROD HANDLE FOR LOCKS.

No. 408,552. Patented Aug. 6, 1889.

WITNESSES
H. C. Newman
Wm Musser

INVENTOR
Henry R. Towne
By his Attorneys
Hopkins & Atkins.

(No Model.) 6 Sheets—Sheet 2.

H. R. TOWNE.
ROD HANDLE FOR LOCKS.

No. 408,552. Patented Aug. 6, 1889.

WITNESSES

INVENTOR
Henry R. Towne
By his Attorneys
Hopkins and Atkins.

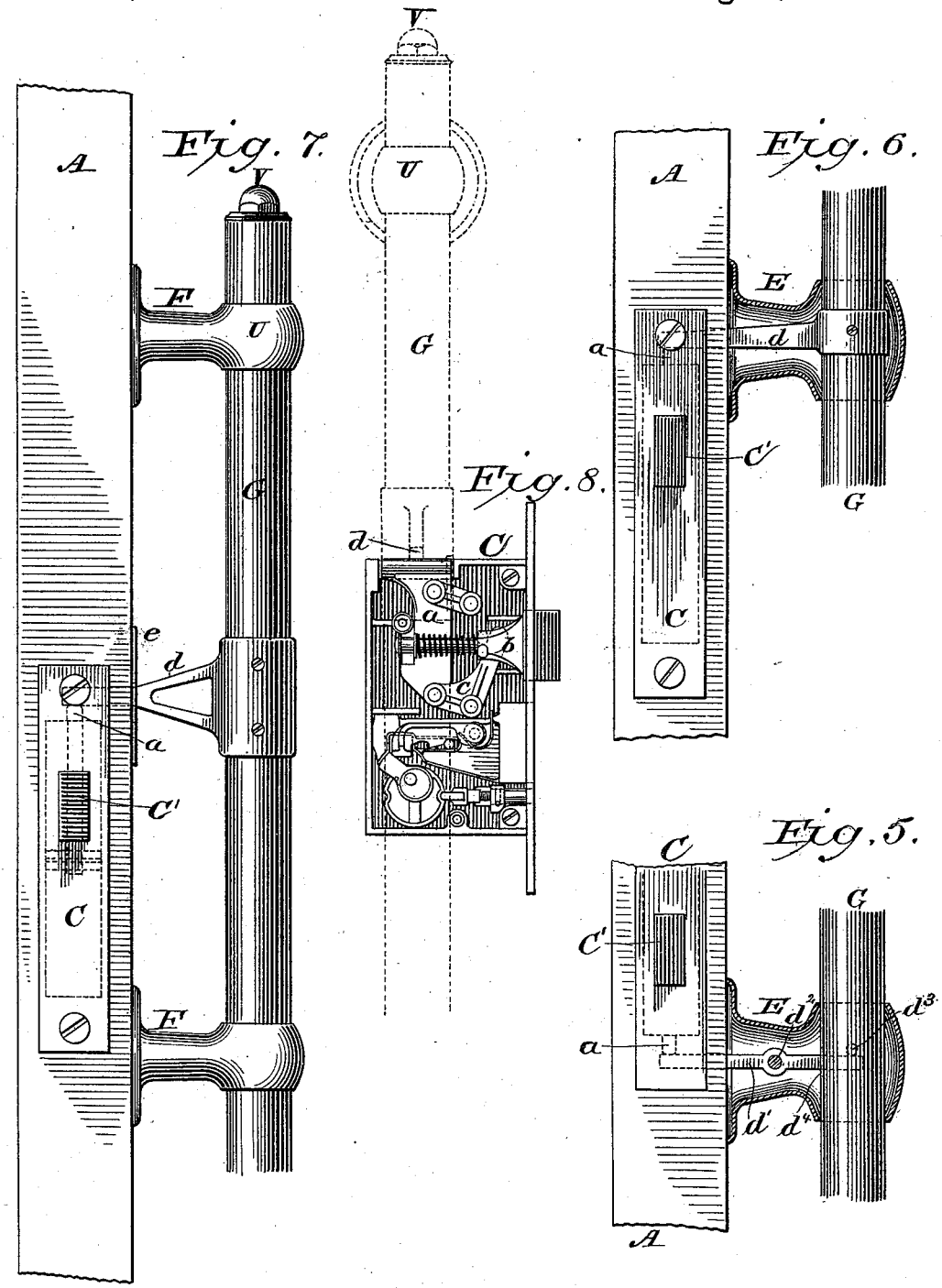

(No Model.) 6 Sheets—Sheet 4.

H. R. TOWNE.
ROD HANDLE FOR LOCKS.

No. 408,552. Patented Aug. 6, 1889.

Witnesses
H. C. Newman.
E. S. Newman.

Inventor
Henry R. Towne,
By
Hopkins & Atkins, Attorneys

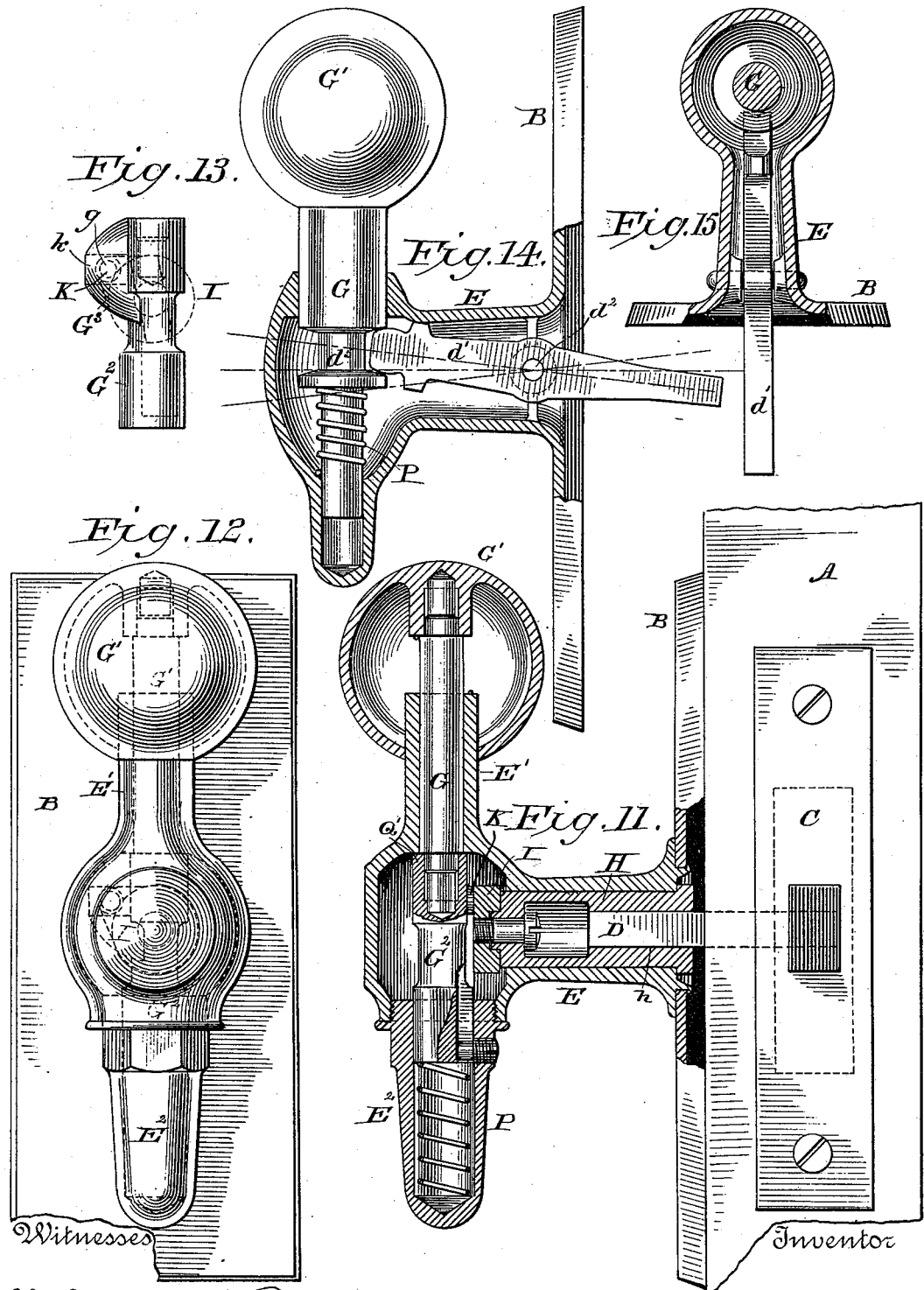

(No Model.) 6 Sheets—Sheet 6.

H. R. TOWNE.
ROD HANDLE FOR LOCKS.

No. 408,552. Patented Aug. 6, 1889.

Witnesses

Inventor
Henry R. Towne,
Hopkins & Atkins.
Attorneys

UNITED STATES PATENT OFFICE.

HENRY R. TOWNE, OF STAMFORD, CONNECTICUT, ASSIGNOR TO THE YALE & TOWNE MANUFACTURING COMPANY, OF SAME PLACE.

ROD-HANDLE FOR LOCKS.

SPECIFICATION forming part of Letters Patent No. 408,552, dated August 6, 1889.

Application filed January 28, 1889. Serial No. 297,771. (No model.)

*To all whom it may concern:*

Be it known that I, HENRY R. TOWNE, of Stamford, county of Fairfield, and State of Connecticut, have invented certain new and useful Improvements in Rod - Handles for Locks, of which the following is a specification, reference being had to the accompanying drawings.

My invention consists of a rod or bar, either long or short, which may be placed on either or both sides of a door, which serves as a handle for the door, and which, being capable of slight reciprocating motion in its supports, serves also to actuate the latch-bolt of one or more locks mortised into or attached to the door. My improved reciprocating rod-handle thus serves the double purpose of a handle for opening or closing the door and of a knob or its equivalent for actuating the lock.

A further advantage resulting from my invention is that it admits of a handle of any length desired, whereby the part which connects with the lock may be at a different height on the door from the part which is most conveniently grasped by the hand of a person opening or closing the door. This is especially convenient in the case of a door composed chiefly of glass, and having therefore a stile too narrow to receive the lock. In such a case at present the lock and its handle have to be placed inconveniently low; but by my invention the lock may be placed at any part of the door where there is sufficient wood to receive it, while the reciprocating handle or rod may be extended to any other point which is within convenient reach.

A further advantage secured by my invention is the capacity to actuate two or more locks by the same rod-handle. In this way one lock may be placed near the bottom of the door, another near the top, and, if desired, another intermediate, all of them being simultaneously actuated by a single motion of the rod or handle.

Figure 1:
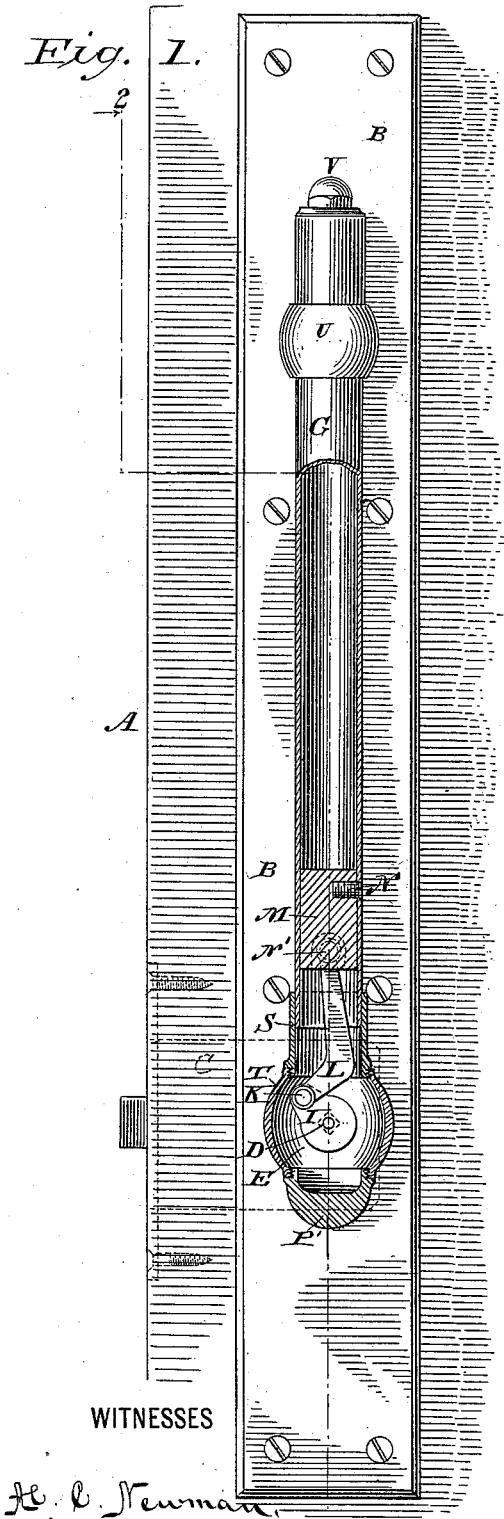
Figure 2:
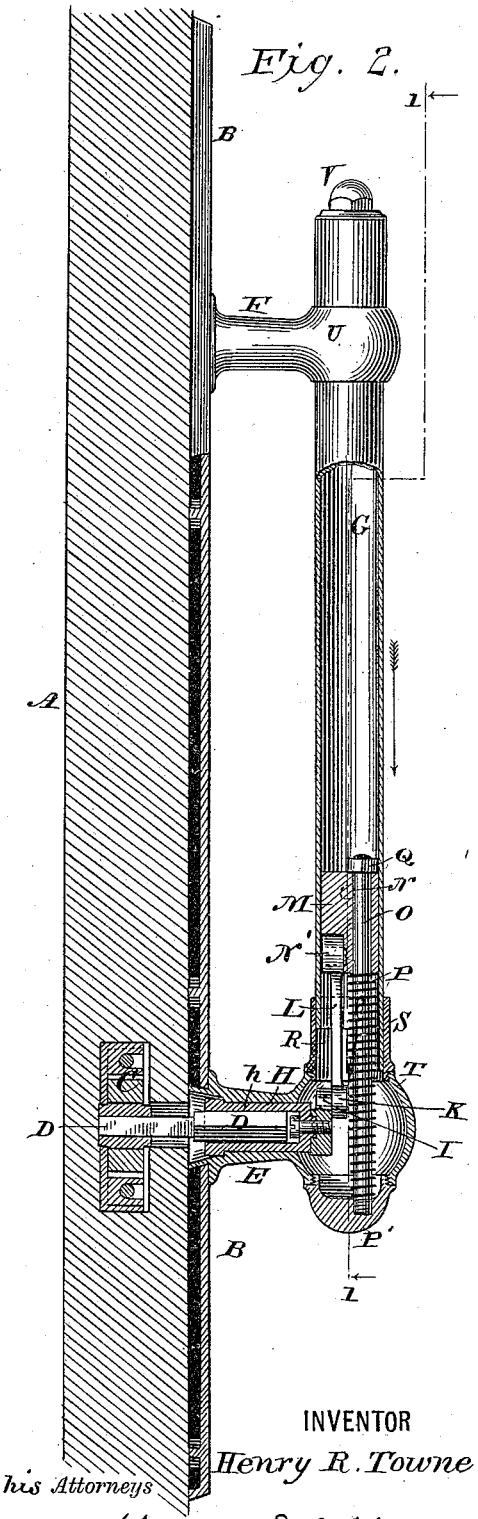
Figure 3:
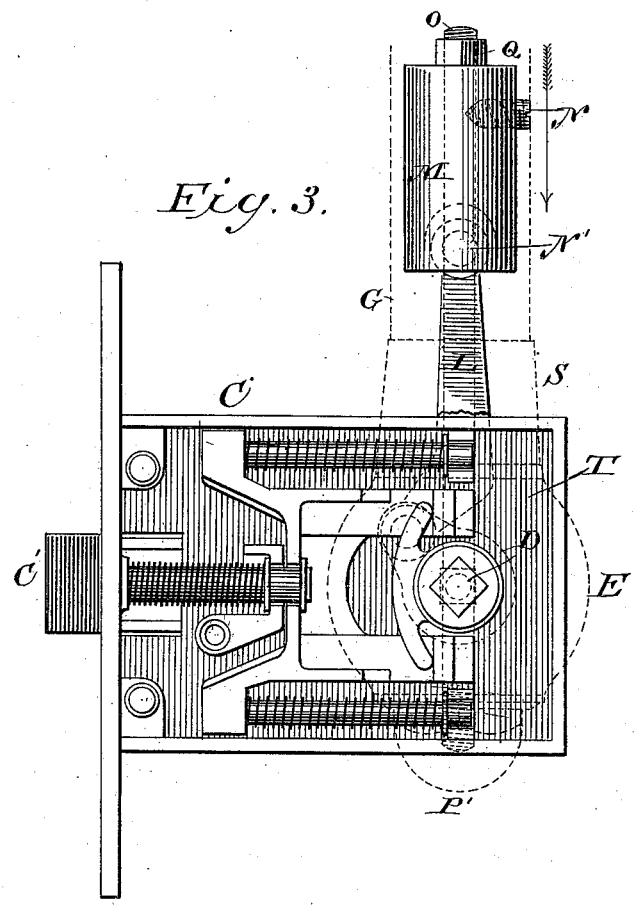
Figure 4:
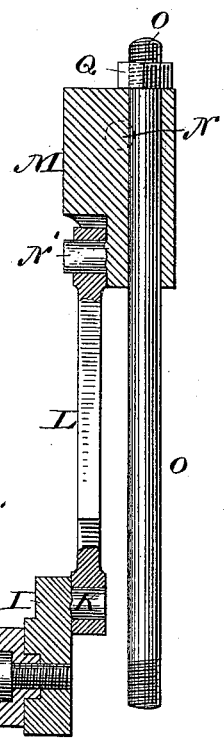
Figure 9:
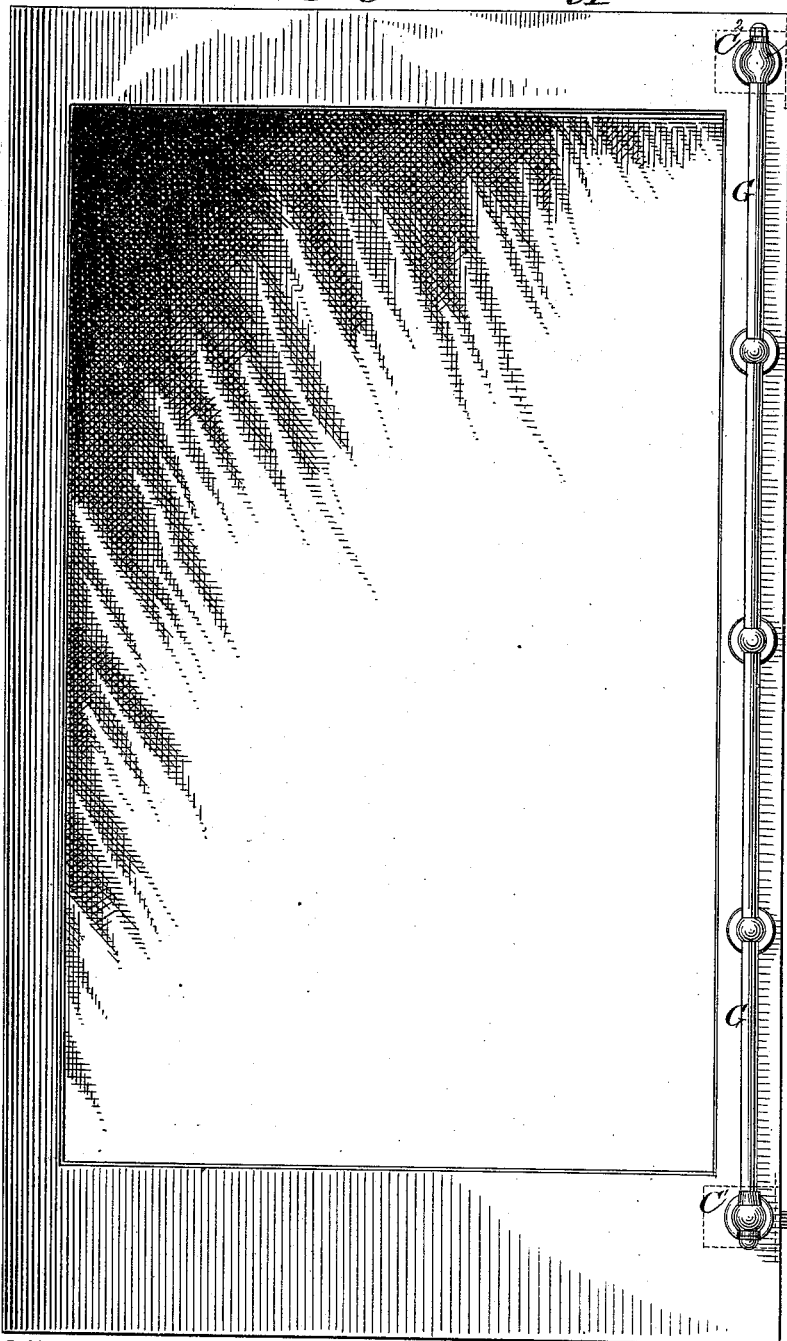
Figure 10:
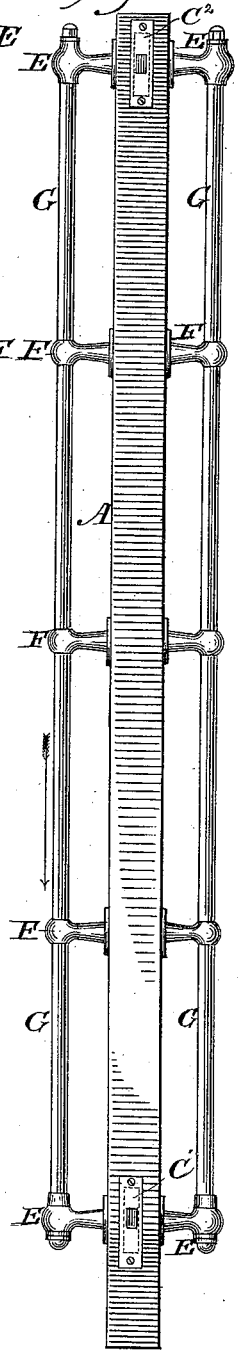
Figure 16:
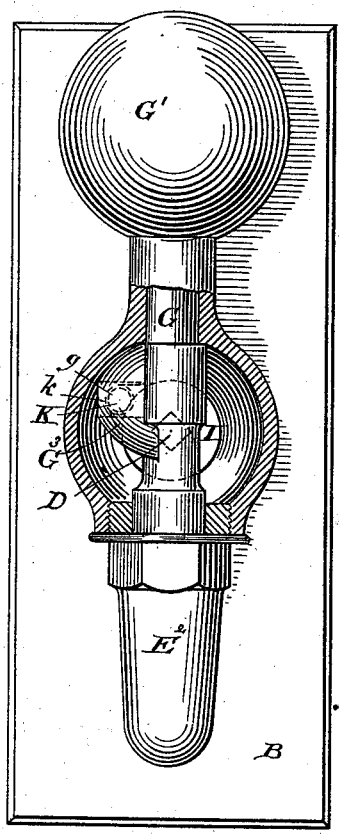
Figure 17:
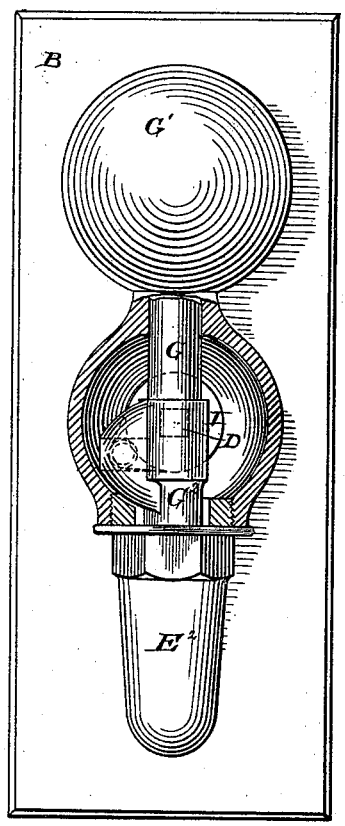
Figure 18:
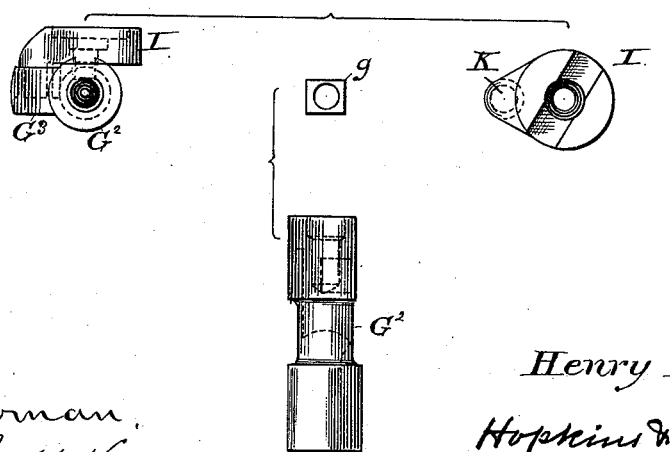

In the accompanying drawings, Figure 1 is a front elevation, partly in section, of my improved rod-handle, on the line 1 1 of Fig. 2, when constructed so as to be attached to a single plate or base and having only moderate length. Fig. 2 is a side elevation of the same, showing partly in section, on line 2 2 of Fig. 1, the internal mechanism. Fig. 3 is an interior view of a spring-lock and of one form of connection between the lock and the rod-handle, indicated in dotted lines. Fig. 4 is a central vertical section through a part of the mechanism detached, the letters indicating the parts shown. Figs. 5, 6, and 7 show formally different means of communicating motion from the rod-handle to the lock-bolt. Fig. 8 is a view of the interior mechanism of a lock described in my patent, No. 180,287, which is the same kind of a lock partly shown in Figs. 5, 6, and 7. Fig. 9 is a side elevation of a glass door having rod-handles extending nearly its whole height and actuating locks near the top and bottom of the door. Fig. 10 is an edge view of the door shown in Fig. 9. Fig. 11 is a central section showing my improved rod-handle mechanism in its simplest form, in which only a single bracket is employed and the length of the reciprocating rod reduced to a minimum, thus adapting the device to use on interior doors of dwellings and other buildings. Fig. 12 is a front view of the device shown in Fig. 11. Fig. 13 is a detached view of a part of the mechanism shown in Fig. 11. Fig. 14 shows a modification of the simple form of the rod-handle with a single bracket when constructed for use with a lock having a projecting slide for actuating the latch-bolt, as described in my said patent. Fig. 15 is a horizontal cross-section of the mechanism shown in Fig. 14. Fig. 16 is a view similar to Fig. 12, but partly in section to better illustrate the internal mechanism. In this figure the rod-handle and crank mechanism is shown in its upper position. Fig. 17 is a similar view with the operative parts shown in their lower position to illustrate the working of the mechanism. Fig. 18 is a group of detached parts of the operating mechanism shown in Figs. 16 and 17.

A designates the door to which the handles are applied. (See Figs. 1, 2, 5, 6, 7, 9, 10, and 11.)

B is a plate for attaching the handles to the door. (See Figs. 1, 2, 11, 12, 14, and 15.) As shown in Figs. 1 and 2, a single plate is used, to which are attached two brackets for carrying the handle, which in this case is of only moderate length—say twelve (12) inches—while in Figs. 5, 6, 7, 8, 9, and 10 each of the brackets has a small base or plate of its own, by which it is attached to the door, these brackets being placed at any desired distance apart to properly support the rod or handle.

C, Figs. 1, 2, 3, 5, 6, 7, 8, 9, 10, and 11, is the spring lock or latch to be operated by the handles, and which may be of any ordinary construction.

D, Figs. 1, 2, 3, 11, 16, and 17, is the rotary spindle of the lock, which is square and fits into the rotating hub of the lock, and at one of its ends into the long rotary sleeve H, Figs. 2, 4, and 11.

E F, Figs. 1, 2, 5, 6, 7, 11, 14, and 15, are brackets extending from the door to guide and support the reciprocating rod G, which is preferably tubular. The rotary sleeve H turns in a bearing within the bracket E, and contains a square socket $h$ to receive one end of the lock-spindle D.

I is a crank or arm attached to one end of the sleeve H, and provided with a crank-pin K, engaging with one end of the link L, as shown best in Fig. 4. The other end of the link L is pivoted to the sliding block M, contained within the rod G, to which it is secured by a screw or pin N, so that vertical motion of the rod G is communicated to the block, and through it and the link is converted into rotary motion of the sleeve H and lock-spindle.

O is a guide-rod extending through the slide-block M and provided with a spring P, tending to force and hold the rod G to its limit of motion in one direction, Figs. 2, 11, and 14.

P′ is a cap end, preferably screwed to place, as shown, closing the bottom of the lower bracket E, and serving also as an abutment for one end of the spring P. A nut or stop Q limits the upward motion of the slide-block M.

S is a sleeve, preferably screw-threaded, as shown in Figs. 1 and 2, fitted to the lower bracket E, and serving as a guide for the lower end of the rod G.

Referring to Figs. 5, 6, 7, and 8, the corresponding letters indicate parts similar to those in Figs. 1, 2, 3, and 4. The lock illustrated in these figures is of the construction shown in my said patent, in which a vertical slide $a$ projects through the bottom (or top) of the lock-case and is moved upward or downward, as the case may be, to actuate the latch $b$ by means of a bell-crank lever $c$. In Fig. 8 this lock is shown with the bell-crank lever and the slide $a$, forming the connection between the rod G and the latch $b$, whereby downward motion of the rod and slide retracts the latch. In Fig. 5 the lock is shown inverted, having the slide $a$ at its bottom. In Fig. 6 the connection between the rod G and the lock is a rigid arm $d$, securely attached to the rod G, so that downward motion of the latter is transmitted directly to the slide $a$ of the lock.

In Fig. 7 the connection from the rod to the lock, instead of being made through one of the brackets E, is made at some point between them by means of the arm $d$, pinned or otherwise secured to the rod G and extending into the door, where it bears against the slide $a$ of the lock. In this case a slotted plate $e$ serves to inclose the opening in the door for the projecting end of the arm $d$.

In Figs. 9 and 10 are brackets corresponding to brackets E E, (shown in Figs. 1, 2, 5, and 6,) through which motion of the rod-handle is transmitted to the locks, while F F F are brackets similar to bracket F, Fig. 2, which serve merely as supports or guides for the rod-handle. It will be seen that vertical motion of the rod G on either side of the door is communicated to both locks at the bottom and top of the door, respectively. In order that each rod G on opposite sides of the door, as shown in Fig. 10, may operate the latch independently, it will be appropriate to use any ordinary divided lock-spindle, not necessary to illustrate because well understood in this art. By this means the use of force enough to overcome two independent springs P will be avoided.

In Fig. 11, E is a hollow bracket similar to that shown in Fig. 2, secured to the door by any suitable base-plate B, and having within it the rotary sleeve H, containing a square socket $h$ to receive one end of the lock-spindle D. Secured to the other end of the sleeve H is the short crank I, having at its outer end the crank-pin K, on which fits loosely the slide-block $g$, Fig. 16.

G is the reciprocating rod, guided at the top by the bearing E′ of the bracket E and at the bottom by the bearing or cap E$^2$, which closes the bottom of the bracket E. The upper end of the reciprocating rod G is provided with a handle of any convenient form—as for example, the ball G′. I prefer to make the rod G in this instance in two parts secured together in any usual way, the lower of which G$^2$ is of cast metal and has a wing G$^3$ projecting from one side, in which is a transverse slot $k$, within which the slide-block $g$ can reciprocate, Figs. 13, 16, and 18.

P is a spring tending to force upward the reciprocating rod against the stop Q′, which limits its upward motion, Fig. 11. It will thus be seen that by depressing the ball G′ and rod G the sliding block $g$ in the transverse slot of the part of the rod G$^2$ carries downward the crank-pin K, thus giving rotary motion to the sleeve H, and through it to the spindle D, which actuates the lock. Upon releasing the downward pressure on the knob G′ the spring P will restore the parts to their original position. As thus constructed, my device is adapted for use on doors of any kind as a substitute for or equivalent of the ordinary rotating knob. As shown by Figs. 14 and 15, it is adapted for use with a latch such as described in my said patent.

In Fig. 5 I have shown a lever $d'$ pivoted at $d^2$ within the bracket E and adapted to be turned upon its pivot to operate the latch-retracting mechanism—such as described in my said patent—by means of a pin $d^3$ in the rod G. A slot $d^4$, to admit the pivoted lever, is indicated in dotted lines in this figure.

In Figs. 14 and 15 a similar construction is shown, except the means of connecting one end of the lever $d'$ with the rod G. In this instance an annular groove $d^5$ in the rod receives one end of the lever and oscillates it pivotally in both directions; but these details are inconsequential. I do not confine my invention to the details of construction exhibited in any of the parts illustrated in the drawings, because they are all capable of great variation without departing from the substance of my invention, which, stated in general terms in its broad aspect, is the employment of a reciprocating rod in connection with a door or the like to serve at once as a door-handle and to operate one or more locks.

Having thus described my invention, what I claim as new, and desire to secure by Letters Patent, is—

1. A combined lock and door-handle consisting of a reciprocating rod-handle moving in a guide or guides attached to the door, in combination with one or more locks, and mechanism connecting said rod with said lock or locks for transmitting motion of the rod to the lock or locks, substantially as set forth.

2. In combination with a reciprocating-rod door-handle, a bracket which guides and supports the rod, and mechanism within said bracket for transmitting motion of the rod to a lock, substantially as set forth.

3. The combination, in one structure, of a door-plate, two or more brackets rigidly secured thereto, a reciprocating rod-handle guided and supported in said brackets, and mechanism for transmitting motion of the rod to a lock, substantially as set forth.

4. The combination of a reciprocating-rod door-handle, one or more brackets for guiding and supporting the same, and an arm or projection rigidly secured to said rod and extending from it to a lock to communicate motion to the latter.

5. As a new article of manufacture, a door-handle consisting of a bracket, a reciprocating rod or slide guided and supported therein, and mechanism for communicating motion of the rod to a lock, substantially as set forth.

6. The combination of a reciprocating rod or handle G with one or more brackets E, and an arm for communicating motion of the handle to a lock, substantially as set forth.

7. The combination of a reciprocating rod or handle G with one or more brackets E, the rotary sleeve H, crank I, and crank-pin K, whereby motion of the rod may be communicated to a lock, substantially as set forth.

8. The combination of reciprocating rod or handle G with one or more brackets E, the spring P, and mechanism for communicating motion of the rod to a lock, substantially as set forth.

In testimony of all which I have hereunto subscribed my name.

HENRY R. TOWNE.

Witnesses:
SCHUYLER MERRITT,
E. D. OGDEN.